United States Patent
Seo et al.

(10) Patent No.: US 10,328,885 B2
(45) Date of Patent: Jun. 25, 2019

(54) VEHICLE SEAT WITH SIDE AIRBAG

(71) Applicant: HYUNDAI DYMOS INCORPORATED, Seosan-si, Chungcheongnam-do (KR)

(72) Inventors: Jin Ho Seo, Yongin-si (KR); Soo Keun Jang, Incheon (KR); Young Min Hyun, Hwaseong-si (KR); Byoung Hoon Lee, Osan-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 49 days.

(21) Appl. No.: 15/652,601

(22) Filed: Jul. 18, 2017

(65) Prior Publication Data
US 2018/0015899 A1    Jan. 18, 2018

(30) Foreign Application Priority Data

Jul. 18, 2016    (KR) .................. 10-2016-0090659

(51) Int. Cl.
*B60N 2/64*    (2006.01)
*B60N 2/70*    (2006.01)
(Continued)

(52) U.S. Cl.
CPC .............. *B60R 21/207* (2013.01); *B60N 2/64* (2013.01); *B60N 2/7017* (2013.01);
(Continued)

(58) Field of Classification Search
CPC .............. B60R 21/207; B60R 21/2165; B60R 2021/0006; B60R 2021/161; B60N 2/64
See application file for complete search history.

(56) References Cited

U.S. PATENT DOCUMENTS 5,851,024 A * 12/1998 Satani .................. B60R 21/01
                                                       280/730.2
6,450,528 B1 * 9/2002 Suezawa ............... B60R 21/207
                                                       280/730.2
(Continued)

FOREIGN PATENT DOCUMENTS

KR    10-2010-0125595 A    12/2010
KR    10-2015-0039499 A     4/2015
(Continued)

OTHER PUBLICATIONS

Korean Office Action dated Jun. 15, 2017 of corresponding Korean Patent Application No. 10-2016-0090659—6 pages.
(Continued)

*Primary Examiner* — Drew J Brown
(74) *Attorney, Agent, or Firm* — Knobbe Martens Olson & Bear LLP

(57) ABSTRACT

Disclosed is a vehicle seat with a side airbag, which includes an airbag module with an airbag cushion accommodated therein; a seat back frame with the airbag module mounted thereto; and a seat back pad provided with bolsters protruding forward at opposite sides thereof, with an accommodation space being formed in an outboard one of the bolsters by coupling the outboard bolster to the seat back frame, thereby allowing the airbag module to be accommodated therein, wherein the seat back pad includes a body part, and a guide part formed in an inboard portion of an inner surface of the outboard bolster to guide deployment of the airbag cushion, and the body part and the guide part are made of materials having different rigidity from each other.

5 Claims, 4 Drawing Sheets

(51) Int. Cl.
  *B60R 21/00* (2006.01)
  *B60R 21/16* (2006.01)
  *B60R 21/207* (2006.01)
  *B60R 21/2165* (2011.01)

(52) U.S. Cl.
  CPC .. *B60R 21/2165* (2013.01); *B60R 2021/0006* (2013.01); *B60R 2021/161* (2013.01)

(56) References Cited

U.S. PATENT DOCUMENTS

| | | | |
|---|---|---|---|
| 7,641,281 B2 * | 1/2010 | Grimm | B60N 2/643 |
| | | | 297/216.13 |
| 8,152,197 B2 * | 4/2012 | Taguchi | B60R 21/207 |
| | | | 280/728.2 |
| 9,592,789 B2 * | 3/2017 | Fujiwara | B60R 21/207 |
| 2018/0015898 A1 * | 1/2018 | Seo | B60N 2/64 |

FOREIGN PATENT DOCUMENTS

| KR | 10-2015-0050970 A | 5/2015 |
|---|---|---|
| KR | 10-2015-0112147 A | 10/2015 |

OTHER PUBLICATIONS

Office Action of corresponding Chinese Patent Application No. 201710586972.7—pages (Jan. 4, 2019).

\* cited by examiner

[FIG.1]
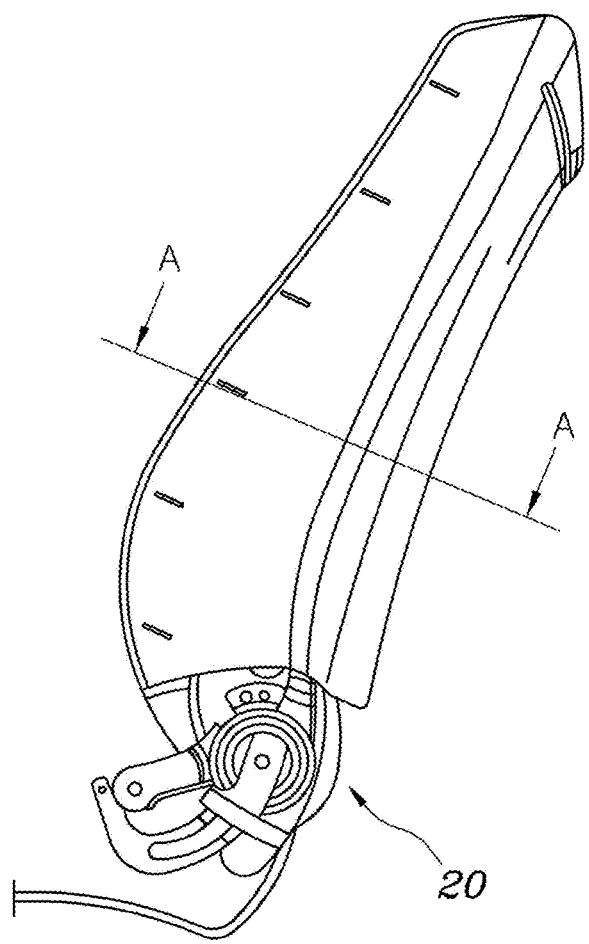

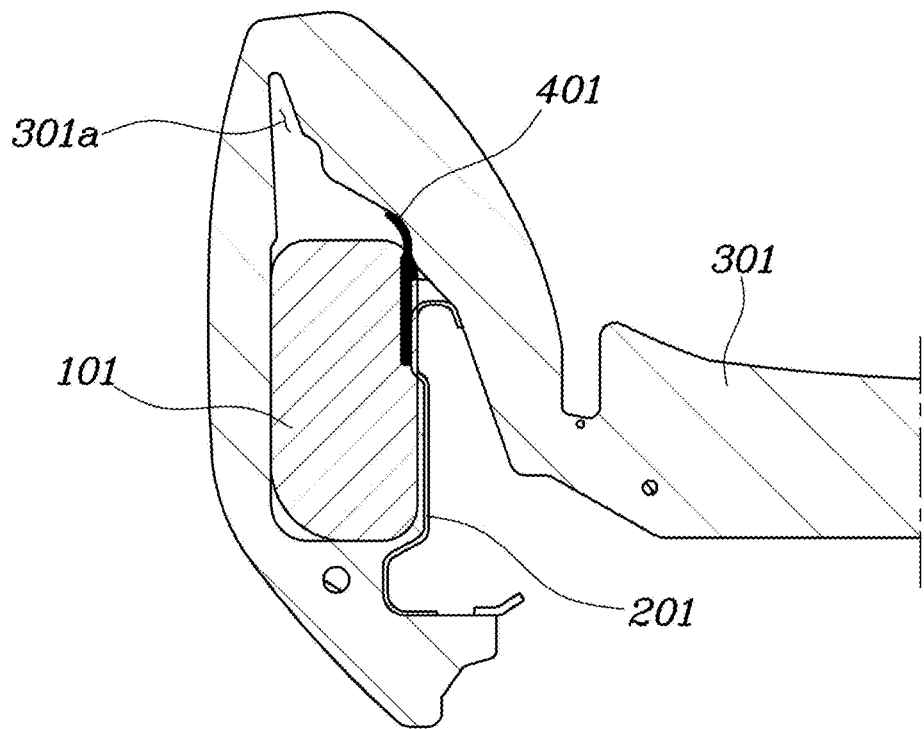
[FIG.2]

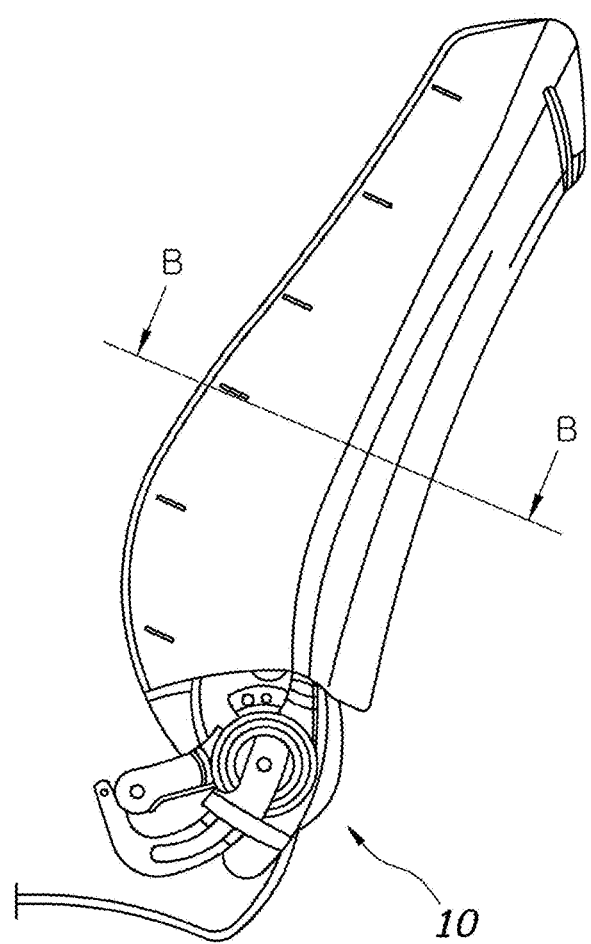
[FIG.3]

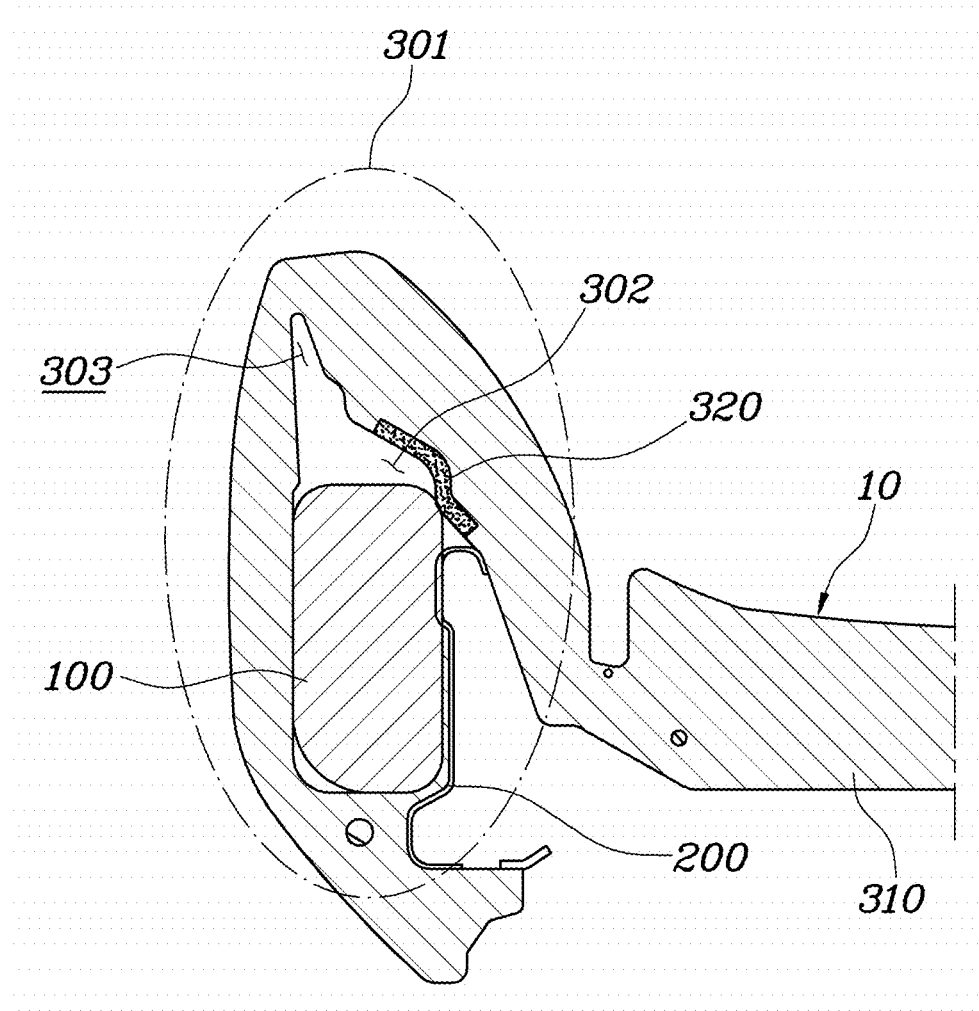
[FIG.4]

VEHICLE SEAT WITH SIDE AIRBAG

CROSS REFERENCE TO RELATED APPLICATION

The present application claims priority to Korean Patent Application No. 10-2016-0090659, filed Jul. 18, 2016, the entire contents of which is incorporated herein for all purposes by this reference.

BACKGROUND

Field

The present disclosure relates generally to a vehicle seat with a side airbag.

Description of the Related Art

Generally, an airbag applied to a vehicle is a safety device for protecting an occupant in the event of an impact such as a collision, and a vehicle is provided with various kinds of airbag devices. In particular, a side airbag is provided to protect the driver's seat and the passenger's seat occupants from an impact occurring at the side of the vehicle.

The side airbag is installed in the seat back of the driver's seat and the front passenger's seat, and is deployed in the direction of the occupant's side of the seat in case of emergency so as to cushion the occupant from a side impact.

Accordingly, in order to more effectively cushion the occupant from a side impact, it is important that the airbag cushion deploys in the correct position and posture when the side airbag is deployed.

The disclosure of this section is to provide background of the invention. Applicant notes that this section may contain information available before this application. However, by providing this section, Applicant does not admit that any information contained in this section constitutes prior art.

SUMMARY

One aspect of the present invention proposes a vehicle seat with a side airbag, in which it is possible to reduce the assembly time of the seat thanks to a simple structure, and it is possible to reduce the weight of the vehicle seat.

Another aspect of the present invention proposes a vehicle seat with a side airbag, in which a deployment direction of the airbag cushion is guided and supported during deployment of the side airbag provided in a seat back of the vehicle seat.

Still another aspect of the present invention provides a vehicle seat with a side airbag, the vehicle seat including: an airbag module with an airbag cushion accommodated therein; a seat back frame with the airbag module mounted thereto; and a seat back pad provided with bolsters protruding forward at opposite sides thereof, with an accommodation space being formed in an outboard one of the bolsters by coupling the outboard bolster to the seat back frame, thereby allowing the airbag module to be accommodated therein, wherein the seat back pad includes: a body part; and a guide part formed in an inboard portion of an inner surface of the outboard bolster to guide deployment of the airbag cushion, and the body part and the guide part are made of materials having different rigidity from each other.

Each of the body part and the guide part of the seat back pad may be made of one selected from a group consisting of polyurethane, polystyrene, polyolefin, polyethylene, polypropylene, phenol resin, polyvinyl chloride, urea resin, silicone, polyimide, melamine resin and a combination thereof, wherein the guide part may be made of a material with rigidity higher than rigidity of the body part.

The seat back pad may be configured such that the body part and the guide part are integrally formed by a double foaming method.

The seat back pad may be configured such that the inner surface of the outboard bolster is formed with a channel in a deployment direction of the airbag cushion, to guide deployment of the airbag cushion.

The guide part may extend from an inboard edge of the airbag module in a direction toward the channel.

According to an embodiment of the present invention, it is possible to reduce manufacturing time by omitting a separate injection process for manufacturing an airbag guide and by omitting assembly time for the airbag guide.

Further, it is possible to reduce the weight of the vehicle seat since the airbag guide is not required.

Further, since the guide part guiding the deployment of the airbag cushion is formed to have higher rigidity than that of the body part, it is possible to facilitate deployment of the airbag cushion and minimize the impact to occupants.

BRIEF DESCRIPTION OF THE DRAWINGS

The above and other aspects, features and other advantages of the present invention will be more clearly understood from the following detailed description when taken in conjunction with the accompanying drawings, in which:

FIG. 1 is a side view showing a typical vehicle seat with a side airbag;

FIG. 2 is a sectional view taken along line A-A of FIG. 1;

FIG. 3 is a side view showing a vehicle seat with a side airbag according to an embodiment of the present invention; and FIG. 4 is a sectional view taken along line B-B of FIG. 3.

DETAILED DESCRIPTION OF EMBODIMENTS

Hereinbelow, embodiments of the present invention will be described in detail with reference to the accompanying drawings. However, the present invention is not limited to the embodiments. For reference, the same reference numerals in this description refer to substantially the same elements and can be described with reference to the contents described in the other drawings under these rules, and the contents that are judged to be obvious to those skilled in the art or repeated may be omitted.

FIG. 1 is a side view showing a typical vehicle seat with a side airbag; and FIG. 2 is a sectional view taken along line A-A of FIG. 1.

As shown in FIGS. 1 and 2, a vehicle seat 20 with a side airbag is configured such that a seat back pad 301 is formed with a silt 301a to guide a deployment direction of an airbag cushion when the side airbag is deployed by operating an airbag module 101 with an airbag cushion accommodated therein, and an airbag guide 401 for guiding the airbag cushion to a direction of the slit is locked to a seat back frame 201.

Here, the airbag guide 401 is molded by injection of steel or a plastic material with higher rigidity than that of the seat back pad 301, and is locked to the seat back frame 201 with a locking means such as a bolt.

Thereby, a strong impact occurring when the side airbag is deployed is supported, and the side airbag is stably deployed by guiding a deployment direction of the airbag cushion.

However, since the airbag guide 401 is separately injection-molded and requires an assembly process for locking it to the seat back frame 201, manufacturing cost rises, and also assembly time during assembly of the vehicle seat 20 increases, thereby reducing productivity.

Further, the airbag guide 401 is made of a heavy material such as steel or plastic, which increases the load of the vehicle seat 20, thereby lowering performance and fuel efficiency of the vehicle.

In embodiments, by differing rigidity of a seat back pad from part to part, even if an airbag guide, which is typically provided in a seat back frame to guide a deployment direction of an airbag cushion, is not provided, it is possible to stably support deployment of the airbag cushion, and is possible to reduce the weight of the vehicle seat.

FIG. 3 is a side view showing a vehicle seat with a side airbag according to an embodiment of the present invention; and FIG. 4 is a sectional view taken along line B-B of FIG. 3.

As shown in FIGS. 3 and 4, a vehicle seat 10 with a side airbag according to an embodiment of the present invention includes: an airbag module 100, a seat back frame 200, and a seat back pad 300.

The airbag module 100 is provided with an airbag cushion therein, and is configured such that the airbag cushion is inflated by gas supplied by an inflator when the impact occurs at the side of the vehicle and is deployed in a lateral direction of the occupant, thereby cushioning the occupant and protecting the occupant from the impact.

The seat back frame 200 is formed in a reversed U shape, and is provided with the airbag module 100 at an outboard side thereof. In embodiments, the seat back frame 200 is made of a material with excellent rigidity, and for example, it may be made of steel or a plastic material.

The seat back pad 300 according to an embodiment of the present invention is provided at the front of the seat back frame 200, wherein the seat back pad is provided with bolsters 301 protruding forward at opposite sides thereof, wherein the bolsters support the sides of the occupant and protrude forward to accommodate the airbag module 100, and the inside of the bolster 301 is formed with an accommodation space 302 with the airbag module 100 accommodated therein.

Meanwhile, the seat back pad 300 includes: a body part 310; and a guide part 320 configured to guide deployment of the airbag cushion when the airbag module 100 is operated, wherein the body part 310 and the guide part 320 are made of materials different from each other.

In embodiments, the guide part 320 is made of a material with rigidity higher than rigidity of the body part 310. Thereby, even if a typical airbag guide for guiding the deployment direction of the airbag cushion is not provided, it is possible to stably support deployment of the airbag cushion, and possible to minimize the impact to occupants when the airbag module 100 is operated.

According to the embodiment of the present invention, it is possible to reduce the weight of the vehicle seat 10 by omitting the typical airbag guide, and further, it is possible to improve performance and fuel efficiency of the vehicle by reducing the weight of the vehicle.

Here, each of the body part 310 and the guide part 320 may be made with foam plastic made of one selected from a group consisting of polyurethane, polystyrene, polyolefin, polyethylene, polypropylene, phenol resin, polyvinyl chloride, urea resin, silicone, polyimide, melamine resin and a combination thereof.

The seat back pad 300 according to an embodiment of the present invention may be manufactured by dual injection-molding, in which the guide part 320 is first injection-molded and then the body part 310 is injection-molded, and the two parts 310 and 320 are integrated into a single body.

In embodiments, the seat back pad 300 is configured such that an inner surface of the bolster 301 is formed with a slit-shaped channel 303 along the deployment direction of the airbag cushion, to guide deployment of the airbag cushion.

This is to facilitate stable deployment in the lateral direction of the occupant by allowing the airbag cushion to penetrate through the relatively thin channel 303 as the airbag cushion is inflated during the operation of the airbag module 100.

In embodiments, the guide part 320 extends from an inboard edge of the front edges of the airbag module 100, which the airbag cushion is deployed toward, in a direction toward the channel 303.

Thereby, it is possible to guide stable deployment of the airbag cushion toward the direction of the channel 303 during the operation of the airbag module 100, and it is possible to protect the occupant and prevent damage to the body part 310 from the impact caused by deployment of the airbag cushion.

Although embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A vehicle seat with a side airbag, the vehicle seat comprising:
    an airbag module;
    a seat back frame; and
    a seat back pad comprising a bolster;
    the bolster comprising an inboard portion and an outboard portion;
    an accommodation space located inside the bolster for accommodating the airbag module therein; and
    a guide part disposed on an inner side of the inboard portion and made of a material that is more rigid than a material of the inboard portion of the bolster,
    wherein the guide part comprises a contact portion that contacts the airbag module and a non-contact portion that does not contact the airbag module,
    wherein the non-contact portion extends from the contact portion to form a gap between the airbag module and the non-contact portion of the guide part as part of the accommodation space such that the gap increases along at least part of an extension of the non-contact portion from the contact portion.

2. The vehicle seat of claim 1, wherein the guide part is made of one selected from a group consisting of polyurethane, polystyrene, polyolefin, polyethylene, polypropylene, phenol resin, polyvinyl chloride, urea resin, silicone, polyimide, melamine resin and a combination thereof.

3. The vehicle seat of claim 1, wherein the seat back pad and the guide part are integrally formed.

4. The vehicle seat of claim 1, wherein the seat back pad is configured such that the accommodation space comprises a channel extending along a deployment direction of the airbag module.

5. The vehicle seat of claim 4, wherein the guide part extends from an inboard edge of the airbag module in a direction toward the channel.

* * * * *